(12) United States Patent
Wasserman et al.

(10) Patent No.: US 11,836,525 B2
(45) Date of Patent: Dec. 5, 2023

(54) DYNAMIC LAST LEVEL CACHE ALLOCATION FOR CLOUD REAL-TIME WORKLOADS

(71) Applicant: Red Hat, Inc., Raleigh, NC (US)

(72) Inventors: Orit Wasserman, Mitzpe Aviv (IL); Marcel Apfelbaum, Afula (IL)

(73) Assignee: Red Hat, Inc., Raleigh, NC (US)

( * ) Notice: Subject to any disclaimer, the term of this patent is extended or adjusted under 35 U.S.C. 154(b) by 159 days.

(21) Appl. No.: 17/125,377

(22) Filed: Dec. 17, 2020

(65) Prior Publication Data

US 2022/0197700 A1 Jun. 23, 2022

(51) Int. Cl.
| | |
|---|---|
| G06F 9/50 | (2006.01) |
| G06F 9/48 | (2006.01) |
| G06F 12/0811 | (2016.01) |
| G06F 12/0871 | (2016.01) |

(52) U.S. Cl.
CPC .......... *G06F 9/5016* (2013.01); *G06F 9/4881* (2013.01); *G06F 9/50* (2013.01); *G06F 9/505* (2013.01); *G06F 9/5044* (2013.01); *G06F 12/0811* (2013.01); *G06F 12/0871* (2013.01); *G06F 2209/508* (2013.01); *G06F 2209/5014* (2013.01); *G06F 2212/603* (2013.01)

(58) Field of Classification Search
None
See application file for complete search history.

(56) References Cited

U.S. PATENT DOCUMENTS

| | | | |
|---|---|---|---|
| 2007/0005909 A1* | 1/2007 | Cai | G06F 12/084 |
| | | | 711/146 |
| 2010/0095300 A1* | 4/2010 | West | G06F 9/5055 |
| | | | 718/104 |
| 2016/0188474 A1* | 6/2016 | Wang | G06F 12/0842 |
| | | | 711/119 |
| 2016/0283272 A1* | 9/2016 | Coleman | G06F 9/5016 |
| 2016/0357674 A1 | 12/2016 | Waldspurger et al. | |
| 2018/0260330 A1 | 9/2018 | Felter et al. | |
| 2018/0293170 A1* | 10/2018 | Koker | G06F 12/0831 |
| 2018/0300182 A1* | 10/2018 | Hwang | G06F 9/505 |

(Continued)

OTHER PUBLICATIONS

Jinhwan Choi, Yu Gu, Jinoh Kim; "Learning-based Dynamic Cache Management in a Cloud"; pp. 1-13, Texas A&M University, USA; Visa Inc., Austin, USA; Feb. 2, 2019; arXiv:1902.00795v1 [cs.DC]—13 Pages.

(Continued)

*Primary Examiner* — Abu Zar Ghaffari
(74) *Attorney, Agent, or Firm* — K&L Gates LLP (57) ABSTRACT

A system includes a memory, a processor in communication with the memory, and an operating system ("OS") executing on the processor. The processor belongs to a processor socket. The OS is configured to pin a workload of a plurality of workloads to the processor belonging to the processor socket. Each respective processor belonging to the processor socket shares a common last-level cache ("LLC"). The OS is also configured to measure an LLC occupancy for the workload, reserve the LLC occupancy for the workload thereby isolating the workload from other respective workloads of the plurality of workloads sharing the processor socket, and maintain isolation by monitoring the LLC occupancy for the workload.

17 Claims, 7 Drawing Sheets

(56) References Cited

U.S. PATENT DOCUMENTS

| | | | |
|---|---|---|---|
| 2019/0042454 A1* | 2/2019 | Kantecki | G06F 12/0804 |
| 2019/0044828 A1* | 2/2019 | Gasparakis | H04L 47/82 |
| 2019/0140918 A1 | 5/2019 | Xu et al. | |
| 2019/0310943 A1* | 10/2019 | Noll | G06F 16/2282 |
| 2020/0218631 A1* | 7/2020 | Wang | G06F 11/3037 |
| 2020/0341811 A1* | 10/2020 | Rostykus | G06F 9/505 |
| 2020/0379907 A1* | 12/2020 | Rostykus | G06F 12/084 |

OTHER PUBLICATIONS

Xiang, Y., Wang, X., Huang, Z., Wang, Z., Luo, Y., & Wang, Z. (2018). "DCAPS: dynamic cache allocation with partial sharing" Proceedings of the Thirteenth EuroSys Conference; Apr. 2018—2 Pages.

Bin Li, et al. "RLDRM: Closed Loop Dynamic Cache Allocation with Deep Reinforcement Learning for Network Function Virtualization" pp. 335-343, Intel Corporation, University of California, Berkeley; 2020, 6th IEEE International Conference on Network Softwarization (NetSoft); 978-1-7281-5684-2/20 2020; Retrieved on Aug. 14, 2020—9 Pages.

Meng Xu, Linh T.X. Phan, Hyon-Young Choi, and Insup Lee, "vCAT: Dynamic Cache Management Using CAT Virtualization", 23th IEEE Real-Time and Embedded Technology and Applications Symposium (RTAS' 17), Pittsburgh, PA, Apr. 2017—14 Pages.

Hanfeng Qin, "Locpart: A Latency Optimized Cache Partitioning for Cloud Data Centers". pp. 443-437, School of Computer Science and Technology, Huazhong University of Science and Technology, Wuhan, China, 2017 4th International Conference on Information Science and Control Engineering; 978-1-5386-3013-6/17 2017 IEEE DOI 10.1109/ICISCE.2017.97.

\* cited by examiner

DYNAMIC LAST LEVEL CACHE ALLOCATION FOR CLOUD REAL-TIME WORKLOADS

BACKGROUND

The present disclosure relates generally to cache allocation for workloads. Computer systems may run workloads (e.g., applications or services) that are provided via a server or cloud. The workloads may be developed and deployed as a single unit or as multiple units, such as a collection of microservices. Additionally, the workloads may run within a pod as a group of containers, which may be run on physical or virtual machines. For example, containers may encapsulate a lightweight runtime environment for an application or a microservice. Containers and their associated application instances may be replicated on node clusters in order to scale applications to meet workload demands.

Each workload or pod (e.g., tenant) may co-exist with other tenants in a cloud environment. Specifically, a cloud infrastructure may represent a multi-tenant processing infrastructure where resources are shared to increase system-wide performance thereby providing enhanced results to clients of the processing infrastructure. One such shared resource memory, such as cache.

SUMMARY

The present disclosure provides new and innovative systems and methods for dynamically allocating cache (e.g., last-level cache) for real-time workloads, especially in a cloud environment. In an example, a system includes a memory, a processor in communication with the memory, and an operating system ("OS") executing on the processor. The processor belongs to a processor socket. The OS is configured to pin a workload of a plurality of workloads to the processor belonging to the processor socket. Each respective processor belonging to the processor socket shares a common last-level cache ("LLC"). The OS is also configured to measure an LLC occupancy for the workload, reserve the LLC occupancy for the workload thereby isolating the workload from other respective workloads of the plurality of workloads sharing the processor socket, and maintain isolation by monitoring the LLC occupancy for the workload.

In an example, a method includes pinning a workload of a plurality of workloads to a processor belonging to a processor socket. Each respective processor belonging to the processor socket share a common LLC. The method also includes measuring an LLC occupancy for the workload and reserving the LLC occupancy for the workload thereby isolating the workload from other respective workloads of the plurality of workloads sharing the processor socket. Additionally, the method includes maintaining isolation by monitoring the LLC occupancy for the workload.

In an example, a non-transitory machine-readable medium stores code which, when executed by a computer system, causes the computer system to pin a workload of a plurality of workloads to a processor belonging to a processor socket. Each respective processor belonging to the processor socket share a common LLC. The non-transitory machine-readable medium also causes the computer system to measure an LLC occupancy for the workload and reserve the LLC occupancy for the workload thereby isolating the workload from other respective workloads of the plurality of workloads sharing the processor socket. Additionally, the non-transitory machine-readable medium causes the computer system to maintain isolation by monitoring the LLC occupancy for the workload.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for dynamically allocating last-level cache ("LLC") for real-time workloads, especially in a cloud environment. For example, real-time workloads may require predictable latency to meet performance criteria expected from a real-time workload. In a cloud environment, noisy neighbors increase the cache misses experienced by workloads (usually L3 cache or LLC), resulting in unpredictable higher latency. For example, a real-time workload may fight with other workloads for LLC space resulting in cache misses and other computational delays. A noisy neighbor may be a co-tenant in a cloud computing infrastructure that monopolizes bandwidth, disk I/O, CPU and other resources. When a processor looks for data, the processor may first try to find the data in the L1 cache, then L2 and finally L3. If the processor is unable to find the data in L3, the processor may attempt to access the data from main memory. The cache misses occur because data requested for processing by a component or application (e.g., a tenant), is not found in the cache memory, which causes execution delays by requiring the program or application to fetch the data from other cache levels or the main memory. Specifically, each cache miss slows down the overall process because after a cache miss in the LLC, the CPU may look to RAM for that data, which increases the time used to access the data thereby increasing the latency.

The systems and methods disclosed herein leverages monitoring, allocation and prioritization techniques to reserve and isolate a real-time workload's LLC occupancy from other workloads (e.g., workloads from other co-tenants on the cloud) to prevent cache misses from noisy neighbors. In an example, the real-time workload may be tagged and pinned to a CPU or a specific CPU socket. The LLC occupancy required by the real-time workload may be monitored and measured in a training environment. For example, the real-time workload occupancy requirements may be monitored and/or measured in a training environment (e.g., an off-line testing environment) to determine how much LLC occupancy should be reserved for the real-time workload when the real-time workload is deployed in a production environment (e.g., deployed for production in a cloud environment).

After the LLC occupancy for the real-time workload is reserved and isolated from other workloads executing in the production environment in the cloud, the LLC occupancy may be continually monitored and adjusted to ensure that the isolation between the real-time workload and the other workloads is maintained. The dynamic LLC occupancy allocation advantageously allows the system and methods described herein to adjust to new conditions. Conversely, static allocation may initially isolate the real-time workload from noisy neighbors, but as conditions change, the original allocation may be unsuitable for current or future conditions. Specifically, a static allocation may reserve too much LLC for the real-time workload resulting in an inefficient use of the resources. If the real-time workload, or any other workload or tenant is not using or underutilizing its allocated cache, system resources are wasted as that cache is unavailable to other users who may benefit from the use of the additional cache.

In other cases, the static allocation may reserve too little LLC (e.g., not enough LLC for the real-time workload), resulting in the same latency spikes discussed above with respect to noisy neighbors. These latency spikes may provide an unsatisfactory experience for an end user that expects certain performance criteria expected from a real-time workload (e.g., real-time or near real-time processing). By using a training session and later dynamically allocating LLC through monitoring, an optimal amount of LLC is dynamically allocated to the real-time workload, which advantageously leads to stable memory usage and a satisfactory user experience.

Figure 1:
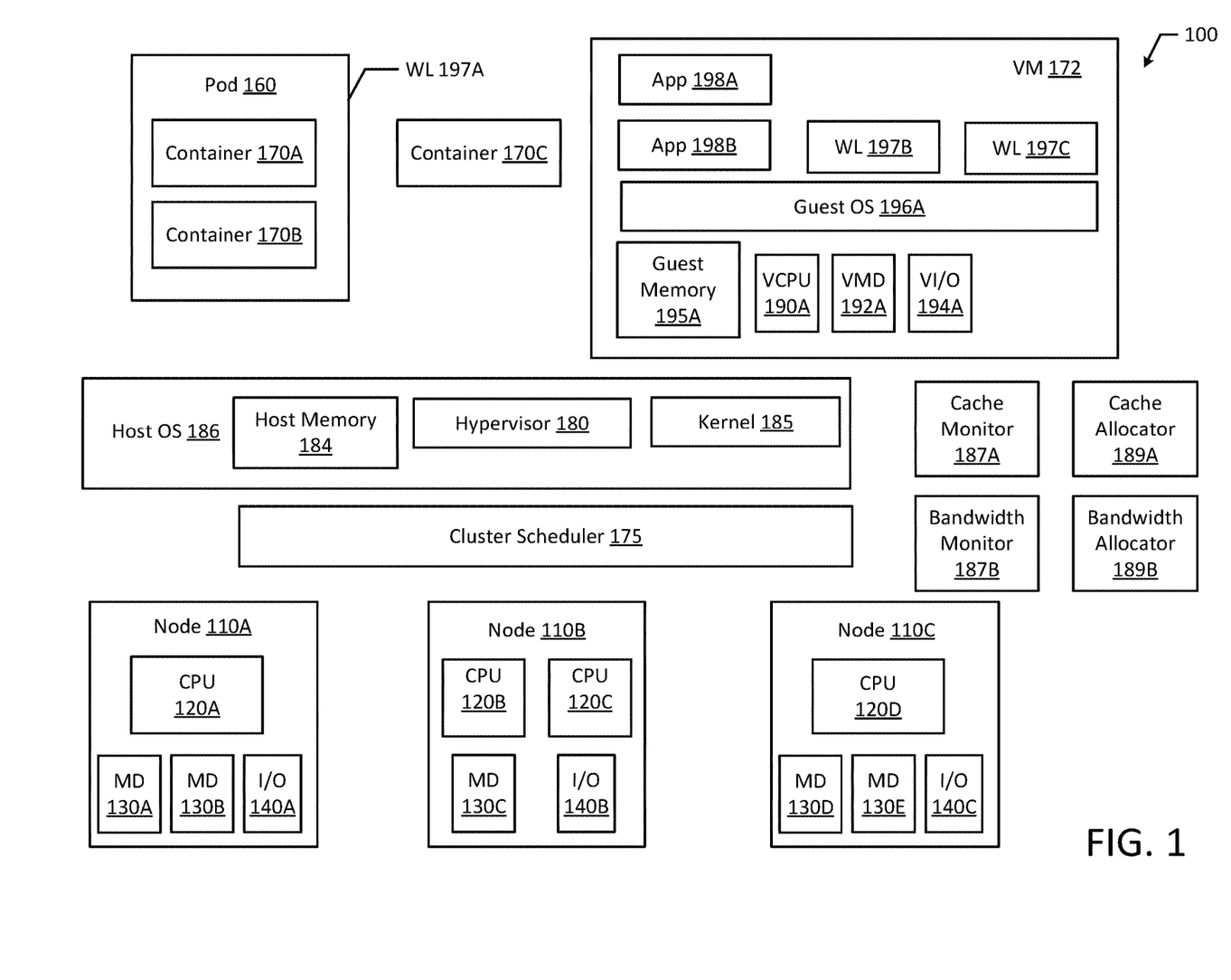
FIG. 1 illustrates a block diagram of an example computing system according to an example embodiment of the present disclosure.

FIG. 1 depicts a high-level component diagram of an example computing system 100 in accordance with one or more aspects of the present disclosure. The computing system 100 may include an operating system (e.g., host OS 186), one or more workloads WL 197A-C, and nodes (e.g., nodes 110A-C). The nodes 110A-C may be cluster nodes.

As used herein, a workload (e.g., WL 197A-C) may be an application (e.g., WL 197B-C, which are similar to App 198A-B running in virtual machine 172), a container (e.g., container 170C) or a pod 160 of containers (e.g., pod 160 with containers 170A-B). The workloads 197A-C (e.g., programs, applications, containers or pods) may be added to the computing system 100 to provide additional application functionality or to scale certain services or aspects of an application. For example, as processes are scaled to meet increased demand from clients, workloads 197A-C (e.g., containers or pods) may be replicated and deployed on various nodes and/or node clusters to handle the increased load.

The computing system 100 may also include a cluster scheduler 175 that initializes, schedules or implements workloads 197A-C on various nodes 110A-C. The cluster scheduler 175, which may be referred to generally as sched-uler 175, may schedule workloads 197 (e.g., pods, containers, applications) based on resource availability, LLC occupancy of the workload 197, LLC availability on the node 100A-C, scheduling policies or load balancing parameters of each workload 197 and/or node 110. In an example, the scheduler 175 may be a monolithic scheduler that handles all scheduling requests or a shared-state scheduler. A shared-state scheduler may have multiple scheduling components with full access to the entire cluster of resources. In an example, scheduler 175 may be a cluster scheduler that uses placement constraints and schedules applications. Additionally, scheduler 175 may schedule workloads 197 rapidly to avoid workloads 197 from sitting in a pending state. LLC occupancy information (e.g., current LLC occupancies) of a cluster node (e.g., node 110A-C) may be exposed to the cluster scheduler 175.

As noted above, the scheduler 175 may schedule workloads 197 (e.g., pods, containers, applications) based on resource availability, LLC occupancy of the workload 197, LLC availability on the node 100A-C, scheduling policies or load balancing parameters of each workload 197 and/or node 110. In some examples, the load balancing parameters may be based on tenant per host density thresholds. For example, the load balancing parameters may be set to increase the tenant per host density or pod per host density, thereby conserving system resources. By maximizing the tenant per host density or workload 197 (e.g., pod 160) per host density, less hosts are used and system resources are conserved. Load balancing parameters may be based on a threshold level of available LLC on a cluster node (e.g., node 110A-C), a threshold quantity of WL(s) 197 on a cluster node, the type of WL(s) on a cluster node, etc. As previously mentioned, LLC occupancy information (e.g., current LLC occupancies) of a cluster node (e.g., node 110A-C) may be exposed to the cluster scheduler 175 for scheduling purposes. Each of the above considerations may be and optimizations may be monitored and adjusted in the event one or more of the WL(s) becomes a noisy neighbor.

In the illustrated example, pod(s) 160 may each include one or more containers 170A-B. As discussed above, a pod 160 may be a workload 197 (e.g., WL 197A). For example, containers 170A-B may be treated as a single unit of deployment in pod 160. In an example, containers 170A-B may be organized in pod 160 and may be co-located on the same node (e.g., node 110A) and share the same resources. Pod 160 and associated containers 170A-B may be located on node 110A and share the same resources, network, memory, and storage of the node 110A (e.g., CPU 120A, memory devices 130A-B, and input/output device(s) 140A). Similarly, pod 160 may be located on a node cluster or group of nodes (e.g., nodes 110B-C). Each pod 160 may have a dedicated IP address that is shared by all the containers belonging to a respective pod 160. Additionally, a pod 160 and/or containers 170A-B scheduled to a node cluster may share the resources of the node cluster (e.g., CPU 120B-D, memory devices 130C-D, and input/output device(s) 140B-C). In an example, multiple pods 160 may be located on the same node (e.g., node 110B). In another example, each pod 160 may be located on its own node 110A-C. Similarly, containers 170A-B may run on the same node (e.g., node 110A) or on different nodes 110, for example, each container 170 may be located on its own node 110.

Containers 170A-C may execute applications, services or microservices. As discussed above, a container 170 may be a workload 197 (e.g., container 170C may be considered a WL 197). In an example, the containers 170A-C may each run a process or service and the containers 170A-C may be any execution environment. For example, the containers 170A-C may be a server, such as a virtual server. It should be appreciated that the containers 170A-C may be stand-alone execution environments, similar to that of a virtual machine.

Virtual machine ("VM") 172 may include a guest OS(s), guest memory or virtual machine memory, a virtual CPU (VCPU), virtual memory devices (VMD), and virtual input/output devices (VI/O). For example, virtual machine 172 may include guest OS 196, guest memory or virtual machine memory 195, a virtual CPU(s) 190, a virtual memory device(s) 192, and a virtual input/output device(s) 194. Virtual machine memory or guest memory 195 may include one or more memory pages. In an example, VM 172 may execute the guest OS 196 and run applications 198A-B or WLs 197B-C, which may utilize the underlying VCPU 190, VMD 192, and VI/O device 194.

The computing system 100 may also include a cache monitor 187A and/or a bandwidth monitor 187B. The cache monitor 187A may be configured to monitor cache utilization and more specifically the last-level cache ("LLC") utilization, utilization by workloads 197 (e.g., pods 160, containers 170, VMs 172, applications, individual threads, etc.). The host OS 186, kernel 185, or cluster scheduler 175 may obtain information from the cache monitor 187A for advanced resource-aware scheduling decisions and for detecting noisy neighbors. The bandwidth monitor 187B may be configured to track workloads 197 (e.g., pods 160, containers 170, VMs 172, applications, individual threads, etc.) and provide memory bandwidth monitoring. Similar to the cache monitor 197A, the host OS 186, kernel 185, or cluster scheduler 175 may obtain information from the bandwidth monitor 187B for detecting noisy neighbors and for non-uniform memory access (NUMA)-aware scheduling.

Additionally, the computing system 100 may include a cache allocator 189A and/or a bandwidth allocator 189B. The cache allocator 189A may be configured to redistribute or reallocate cache between workloads 197 (e.g., pods 160, containers 170, VMs 172, applications, individual threads, etc.). For example, cache may be redistributed or reallocated between the workloads 197. The bandwidth allocator 189B may be configured to provide control over memory bandwidth available to workloads 197 (e.g., pods 160, containers 170, VMs 172, applications, individual threads, etc.) thereby providing interference mitigation and bandwidth shaping capabilities for noisy neighbors present in the system 100. One or more of the features and capabilities of the cache monitor 187A, bandwidth monitor 187B, cache allocator 189A and/or the bandwidth allocator 189B may instead be handled by the host OS 186 or kernel 185. Additionally, one or more of the above capabilities and features may be handled by the cluster scheduler 175.

The computer system 100 may include one or more nodes 110A-C. The nodes 110A-C may be cluster nodes with one or more machines running in a cluster. Each node 110A-C may in turn include one or more physical processors (e.g., CPU 120A-E) communicatively coupled to memory devices (e.g., MD 130A-E) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

Workloads 197 may be provisioned on the same host or node (e.g., node 110A) or different nodes. For example, WL 197A and WL 197B may both be provisioned on node 110A. Alternatively, WL 197A may be provided on node 110A while WL 197B is provisioned on node 110B. Nodes 110A-C may be non-uniform memory access ("NUMA") nodes.

As used herein, a processor may also be referred to as a central processing unit (CPU). Additionally, as used herein, physical processor or processor (e.g., CPU 120A-D) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

As discussed herein, a memory device 130A-E refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-E may be provided by one or more local buses of suitable architecture, for example, peripheral component interconnect (PCI).

Figure 2:
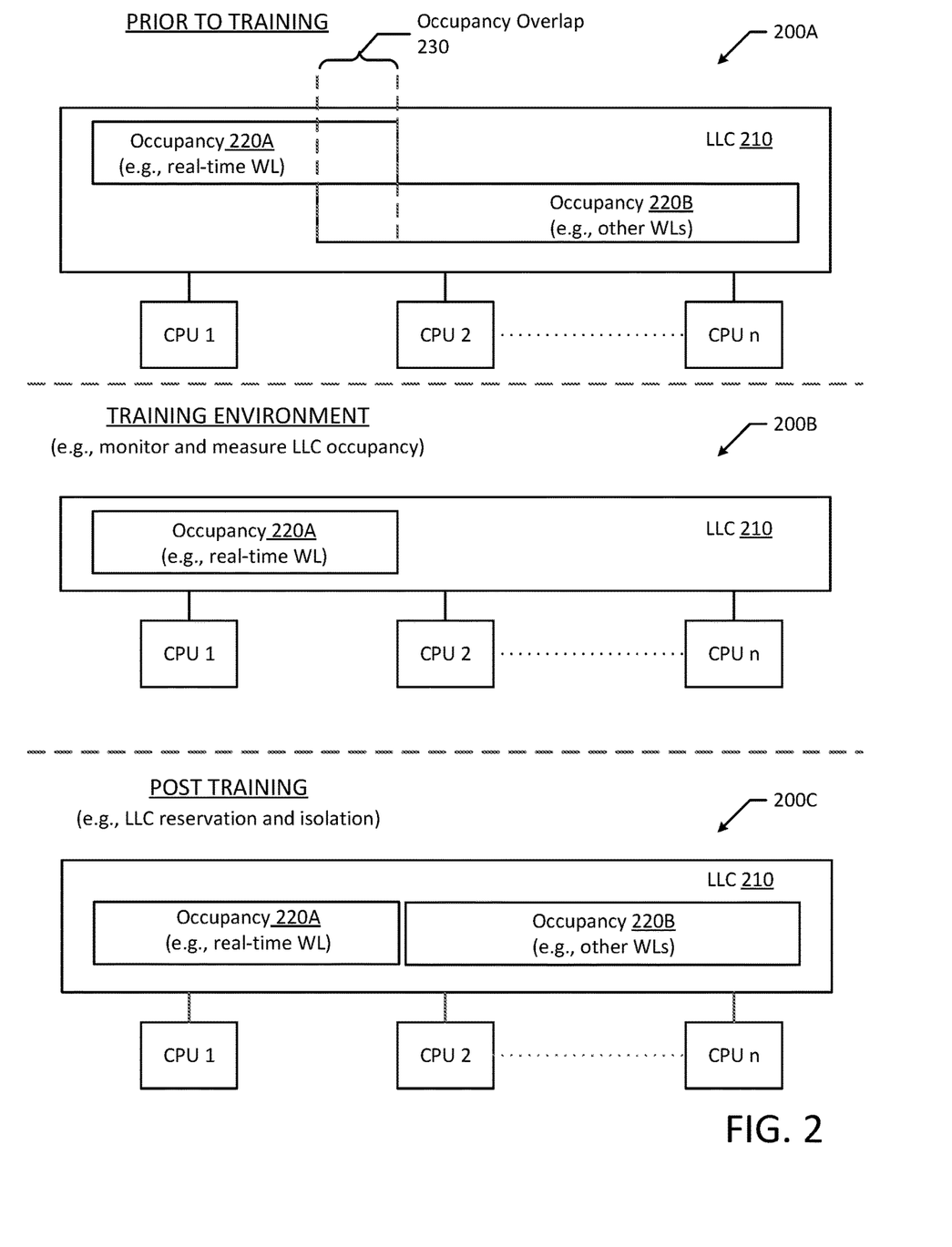
FIG. 2 illustrates various cache allocation schemes according to an example embodiment of the present disclosure.
Figure 3:
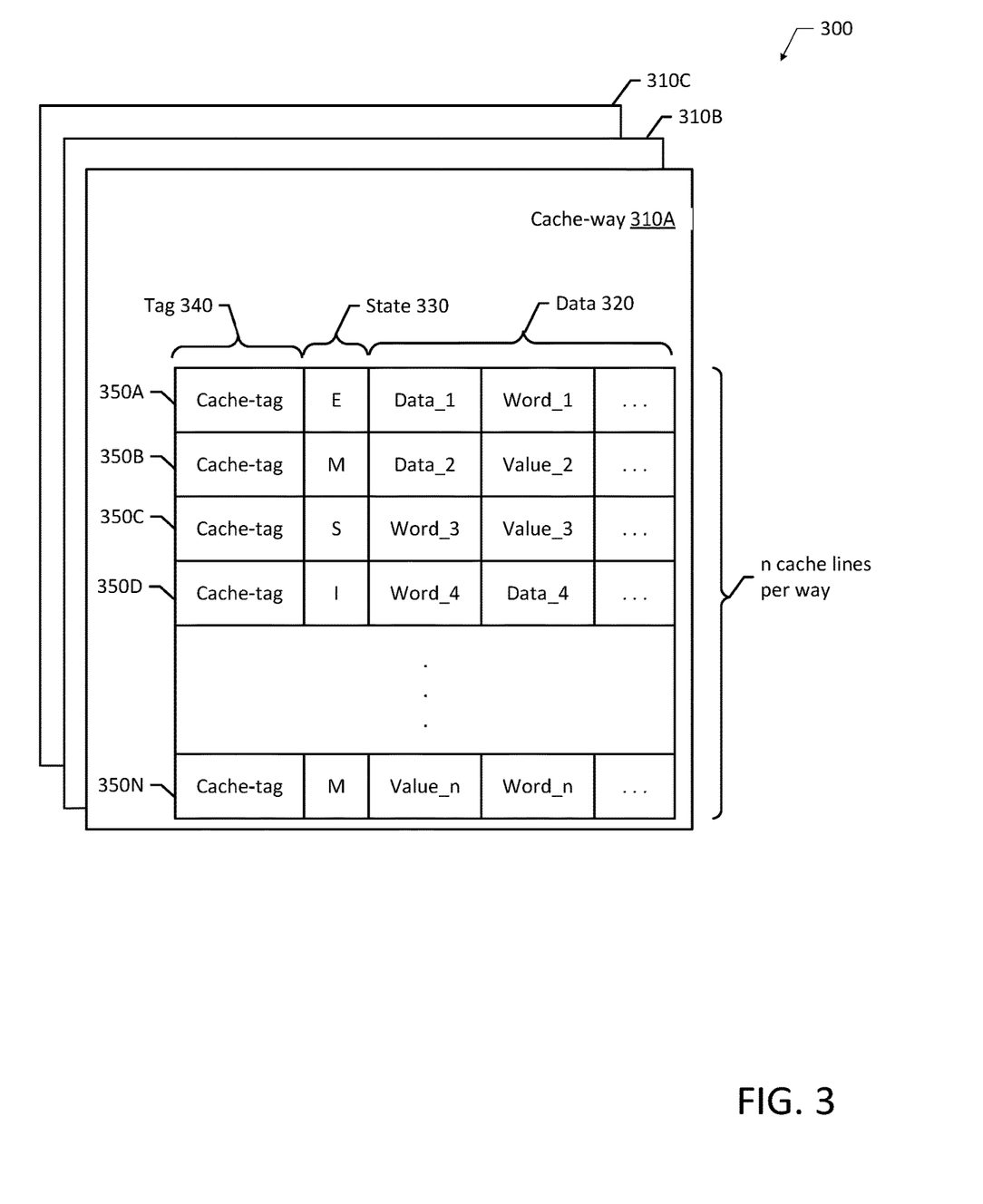
FIG. 3 illustrates a block diagram of cache and more specifically of cache-ways according to an example embodiment of the present disclosure.

FIG. 2 illustrates a block diagram of LLC allocations for real-time workloads and other workloads. Each allocation scheme 200A-C illustrates the cache occupancy (e.g., 220A-B) or cache allocation of various workloads. The LLC 210 may represent a cache-line, a cache-way (e.g., cache-way 310A-C as illustrated in FIG. 3) or a cache-line group.

As illustrated in allocation scheme 200A (e.g., prior to training), a real-time workload may occupy a portion of LLC cache 210 as denoted by occupancy 220A. Similarly, other workloads may occupy a portion of the LLC cache 210 as denoted by occupancy 220B. As illustrated in allocation scheme 200A, real-time workload and the other workloads compete with each other for LLC space resulting in an occupancy overlap 230. For example, the occupancy 220A of the real-time workload and the occupancy 220B of the other workloads may overlap, thereby forming an occupancy overlap 230. The other workloads may be considered noisy neighbors, which may be workloads from a co-tenant in a cloud computing infrastructure that monopolize bandwidth, disk I/O, CPU and other resources. The occupancy overlap 230 resulting from these other workloads or noisy neighbors may result in cache misses. For example, the cache misses may occur because data requested for processing by the real-time workload (e.g., a component, application, pod, or tenant), is not found in the cache memory. In an example, one of the other workloads or noisy neighbors may overwrite a portion of the cache (e.g., LLC 210) in the occupancy overlap 230, which causes execution delays by requiring the real-time workload to fetch the data from the main memory.

These execution delays may add latency to the system where the real-time workloads are expected to execute with low latency. Low latency systems or networks are typically optimized to process a very high volume of data with minimal delay (latency) and thus the low latency systems or networks are designed to support operations that require near real-time access to rapidly changing data. Adding to computation times or increasing the time to fetch data may greatly reduce user experience with real-time workloads.

To prevent the occupancy overlap 230 and thereby reduce the occurrence of or prevent cache misses, the occupancy 220A for the real-time workload may be established so it can later be reserved and isolated from other workloads. For example, as illustrated in allocation scheme 200B (e.g., during training in the training environment), the LLC occupancy 220A of the real-time workload may be monitored and measured. The training environment or test environment may be an off-line environment or non-real time environment. In an example, the workload 197 may be built with a training layer or a testing layer, such that the workload 197 can be deployed as a training workload in the training environment. In the training environment, the workload 197 may start running or executing on "CPU 1", but may execute on more than one CPU. For example, the LLC 210 may be assigned to a group of CPU(s), such as "CPU 1", "CPU 2", etc. up to "CPU n." In an example, a single pod 160 may exclusively use the LLC 210 and therefore may exclusively use the CPU(s) associated with the LLC 210. Specifically, other applications or OS(s) may be restricted from using the LLC 210.

When determining which workloads 197 to monitor and provide predicable latency for (e.g., by reserving LLC occupancy 220A for the workload 197 while isolating other workloads from the real-time workload 197), the real-time workload 197 may be tagged for tracking and monitoring. In an example, the workload 197 may be tagged with a label, such as a Kubernetes/OpenShift label. Specifically, tagging enables both organization and monitoring of the workload 197. In an example, the tag may be a property or annotation associated with a label or metadata assigned to the workload 197. In an example, the tags may be automated rule-based tags. Additionally, monitoring may be achieved by property based group detection rules. The tags, such as Kubernetes-based tags may be searchable, which allows a user of a system component to easily find the tagged workload 197 and inspect the monitoring results of the workload 197. The tags may also be used to create alerts or other alerting profiles based on LLC usage, LLC occupancy or other performance metrics.

In an example, the OS (e.g., host OS 186) may tag the workload. In another example, a scheduler (e.g., scheduler of the OS or the cluster scheduler 175), or the kernel 185 may tag the workload. Alternatively, tagging may also be performed by a CPU handler. For example, the CPU handler may be configured to monitor and control how shared resources, such as LLC and memory bandwidth are used by workloads 197 (e.g., applications 198, pods 160, containers 170, virtual machines ("VMs") 172). Other programs or applications may also be used to tag the workload 197. In other examples, a user may initiate the tagging process.

In one illustrative example, the workload 197A in the cluster context may be a pod 160 running one or more containers 170A-B, where the containers 170A-B collectively make up the workload 197A. The workload 197A may be tagged by a cluster scheduler 175 or a cluster administrator such that the cluster scheduler 175 may locate a suitable cluster node (e.g., node 110A-C) for the workload 197A. In an example, the tag may contain an expected LLC occupancy for the workload 197A based on the off-line training of the real-time workload 197A discussed above in allocation scheme 200B.

After the LLC occupancy 220A is determined for the real-time workload, the LLC occupancy 220A may be reserved and isolated from other workloads. As illustrated in allocation scheme 200B (e.g., post training), the real-time workload occupies the portion of LLC cache 210 as denoted by occupancy 220A. The LLC occupancy 220A is reserved based on the occupancy measured during training. For example, the real-time workload may be allocated the amount of LLC specified during training such that the real-time workload has a cache occupancy 220A. Additionally, the other workloads are isolated from the real-time workload such that the other workloads occupy only the portion of the LLC cache 210 as denoted by occupancy 220B. Instead of the real-time workload and the other workloads competing with each other for LLC space resulting in an occupancy overlap 230 (as illustrated in in allocation scheme 200A), the LLC occupancies 220A-B are established to prevent an occupancy overlap. By preventing an occupancy overlap 230, the other workloads are prevented from acting as noisy neighbors (e.g., monopolizing LLC cache, causing processing delays or increasing the latency of the system) thereby creating a predictable latency for the real-time workloads.

It should be appreciated that the systems, methods and techniques described herein may similarly be applied to higher levels of cache, to reduce cache misses in L1 cache or L2 cache, thereby reducing latency caused by searching for data first in L1 cache and then L2 cache before looking for the data in L3 cache.

FIG. 3 illustrates a block diagram of cache 300. In the illustrated example, cache 300 includes a plurality of cache-ways 310A-C. Each cache-way 310A-C may include a plurality of cache-lines 350A-N. For example, cache-way 310A may include "n" cache lines 350. In an example, the cache-ways 310A-C, generally referred to herein as cache-way 310, may be a consecutive range of cache-lines 350A-N, which may be predefined by a CPU vendor. In other examples, the cache-lines 350 may be arranged in cache-line groups that may include non-consecutive ranges of cache-lines 350. Additionally, each cache-line may store data 320 and may have an associated state 330 and tag 340. The data 320 stored in the cache-lines 350A-N may include various values, words or any other types of data stored in cache. The cache-tag 340 may identify a specific cache line 350 or may identify properties associated with the cache line 350. The state 330 may be an exclusive state, a modified state, a shared state or an invalid state.

An exclusive state (e.g., illustrated as "E") may indicate that the cache-line (e.g., cache-line 350A) is present only in the current cache, but is clean. For example, the cache-line (e.g., cache-line 350A) includes data 320 that matches the data in main memory. A cache-line (e.g., cache-line 350A) with an exclusive state may be changed to a shared state at any time, in response to a bus read request. Alternatively, the cache-line 350 may be changed to a modified state when writing to the cache-line (e.g., cache-line 350B). A modified state (e.g., illustrated as "M") may indicate that the cache-line (e.g., cache-line 350B) is present only in the current cache and is dirty. For example, the cache line (e.g., cache-line 350B) has been modified from the value in main memory. Cache-lines (e.g., cache-line 350B) with a modified state may be required to write the data 320 back to main memory at some time in the future, before permitting any other read of the (no longer valid) main memory state.

Meanwhile, a shared state (e.g., illustrated as "S") may indicate that the cache-line (e.g., cache-line 350C) is stored in other caches of the machine and is clean (e.g., the data 320 in the cache-line 350 matches main memory). Cache-lines (e.g., cache-line 350C) with a shared state may be discarded (or changed to an invalid state) at any time. Writes to cache-lines (e.g., cache-line 350C) in the shared state may receive special handling. The invalid state (e.g., illustrated as "I") may indicate that the cache-line (e.g., cache-line 350D) is invalid or unused.

Figure 4:
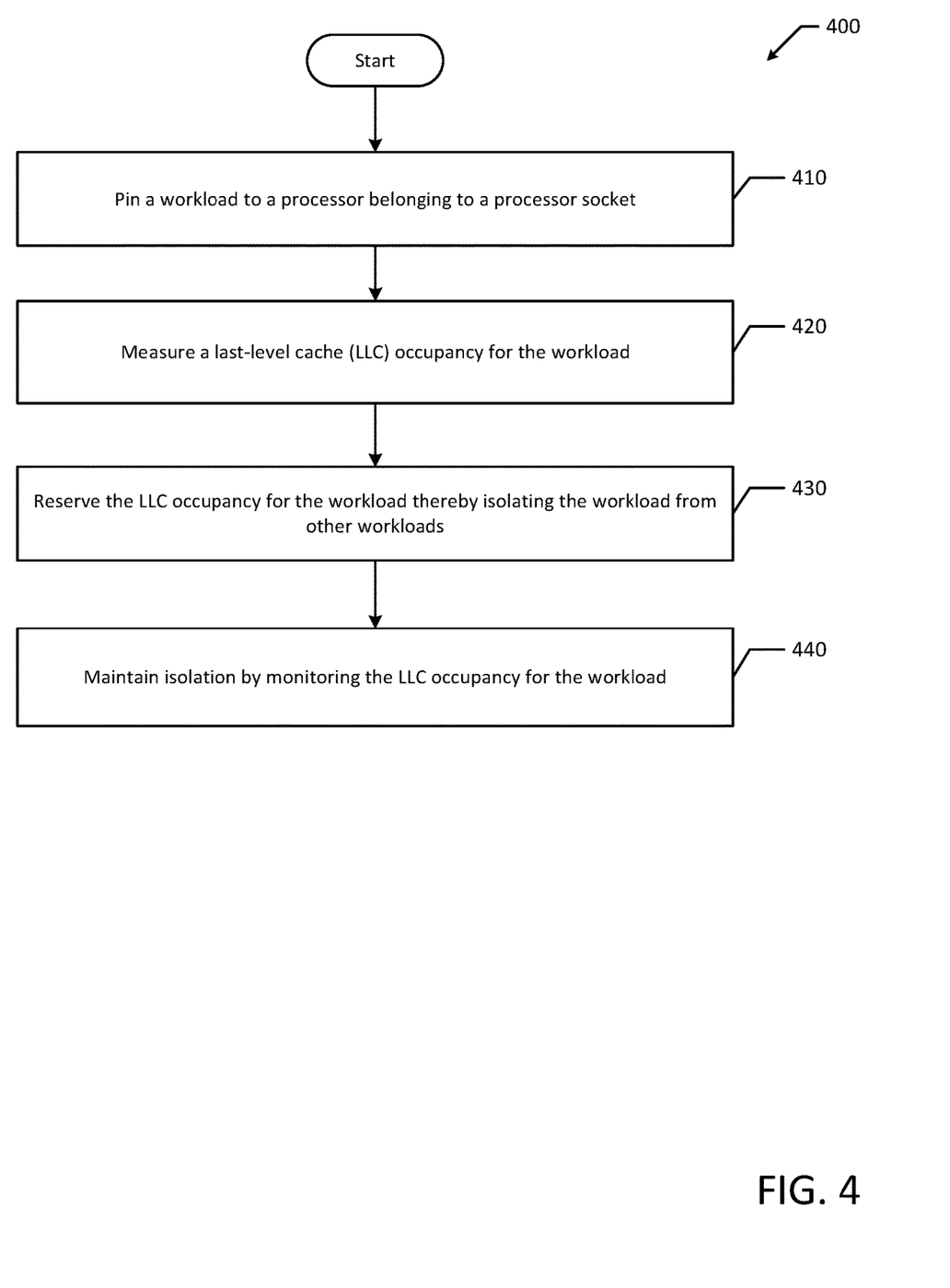
FIG. 4 illustrates a flowchart of an example process for cache allocation according to an example embodiment of the present disclosure.

FIG. 4 illustrates a flowchart of an example method 400 for allocating LLC for real-time workloads according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, one or more blocks may be repeated, and some of the blocks described are optional. The method 400 may be performed by processing logic that may comprise hardware (circuitry, dedicated logic, etc.), software, or a combination of both.

The example method 400 includes pinning a workload to a processor belonging to a processor socket (block 410). For example, the workload 197 (e.g., real-time workload) may be pinned to a processor (e.g., CPU 120B) belonging to a processor socket (e.g., CPU socket). Each processor (e.g., CPU 120B-C) belonging to the processor socket (e.g., CPU socket) may share a common LLC 210. The workload 197 may be pinned by the host OS 186, the kernel 185. As noted above, the processor may be a CPU (e.g., CPU 120B) and the processor socket may be a CPU socket. Method 400 also includes measuring a last-level cache occupancy for the workload (block 420). For example, the LLC occupancy 220A for the workload 197 (e.g., real-time workload) may be measured. The LLC occupancy 220A may be measured in an off-line training environment. In an example, the occupancy may be determined by executing the workload in the off-line training and measuring the amount of LLC the workload occupies. In some instances, several training sessions may be used to determine the LLC occupancy. Specifically, the LLC occupancy 220A may be measured with a counter, such as a CPU counter that stores the counts of activities (e.g., hardware related activities) and that may measure an exact amount of cache occupied by the workload 197. A CPU counter may be programmed with an index of an event type to be monitored and may provide low-overhead access to detailed performance information related to a CPU's functional units, caches, main memory, etc. The counter may be monitored during a monitoring period (e.g., 5-15 milliseconds), however it should be appreciated that the monitoring period may be shorter (e.g. less than 5 milliseconds) or longer (e.g., greater than 15 milliseconds and upwards of hundreds of milliseconds) depending on the workload 197. In an example, the host OS 186 or the kernel 185 may poll the CPU counter.

Additionally, method 400 includes reserving the LLC occupancy for the workload thereby isolating the workload from other workloads (block 430). For example, the LLC occupancy 220A for the workload 197 (e.g., real-time workload) may be reserved thereby isolating the workload 197 (e.g., real-time workload) from other respective workloads sharing the processor socket. In an example, the LLC 210 may be configured such that the workload 197 (e.g., real-time workload) is allocated a portion of the LLC 210 (e.g., LLC occupancy 220A) while the other workloads are allocation another portion of the LLC 210 (e.g., LLC occupancy 220B) thereby isolating the workload 197 (e.g., real-time workload) form the other workloads. The allocation and isolation may be achieved through a page directory or through indexing. In an example, the LLC 210 or more generally the cache 300 may be divided into cache-lines 350, cache-ways 310, or cache-line groups. The workloads may be allocated a portion of LLC 210 in such a way that the workload 197 (e.g., real-time workload) uses different cache-lines 350, cache-ways 310 or cache-line groups that the other workloads.

Then, method 400 includes maintaining isolation by monitoring the LLC occupancy for the workload (block 440). For example, the workload 197 (e.g., real-time workload), and more specifically the LLC occupancy 220A of the workload 197, may be monitored to maintain isolation. While the workload 197 is executing, network traffic may increase and the workload 197 may use additional LLC. By monitoring the workload 197, the allocation (e.g., LLC occupancy 220A) of the workload 197 may be dynamically adjusted to ensure that isolation from the other workloads is preserved. Alternatively, workloads 197 may be re-assigned or evicted from the current node 110 to maintain isolation. For example, if the workload 197 (e.g., real-time workload) requires additional LLC, then the host OS 186 or kernel 185 may increase the allocation for the workload 197 and decrease the allocation for the other workloads. If there is insufficient cache remaining for the other workloads, some of those workloads may be evicted. Alternatively, the workload 197 (e.g., real-time workload) may be re-assigned or moved to another cluster node that has adequate LLC to accommodate the increased LLC occupancy 220A of the workload 197.

Figure 5A:
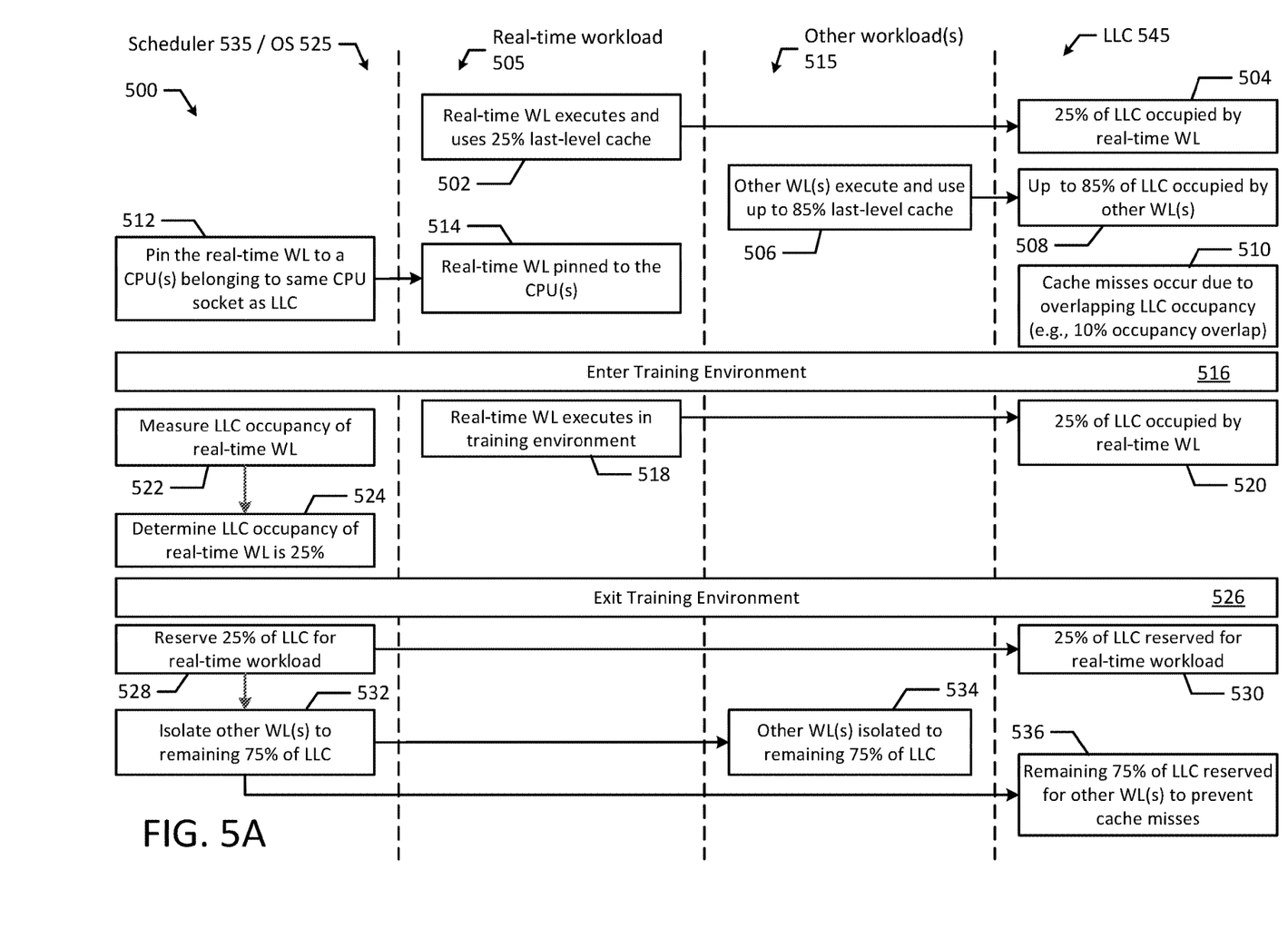
FIGS. 5A and 5B illustrate a flow diagram of an example process for dynamic cache allocation for real-time workloads according to an example embodiment of the present disclosure.
Figure 5B:
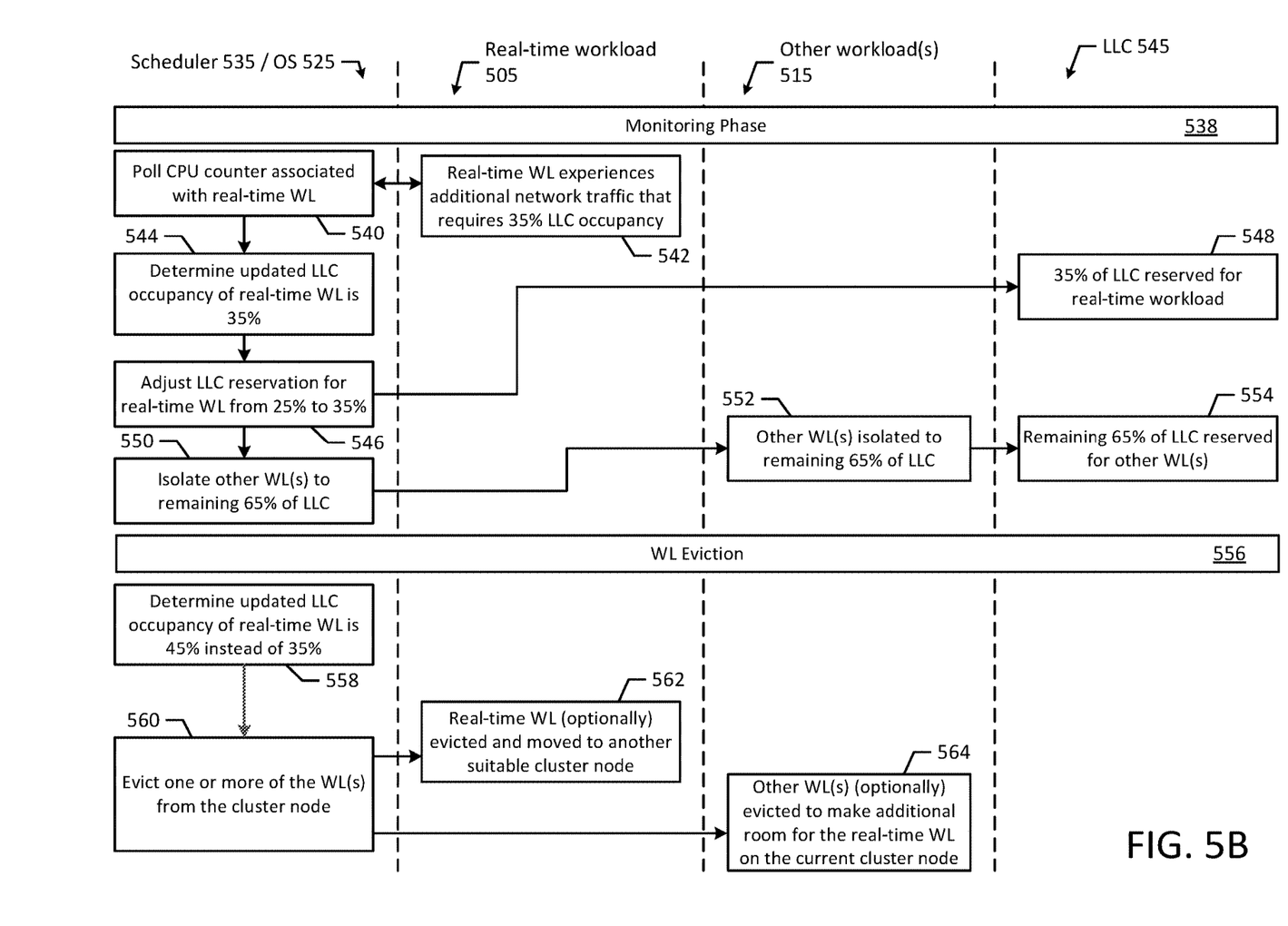

FIGS. 5A and 5B illustrate a flowchart of an example method 500 for dynamically allocating LLC for real-time workloads in accordance with an example of the present disclosure. Although the example method 500 is described with reference to the flowchart illustrated in FIGS. 5A and 5B it will be appreciated that many other methods of performing the acts associated with the method 500 may be used. For example, the order of some of the blocks may be changed, certain blocks may be combined with other blocks, one or more blocks may be repeated, and some of the blocks described are optional. For example, a scheduler 535 or an operating system (e.g., OS 525, such as host OS 186) may communicate with a real-time workload 505 and other workloads 515 to perform example method 500 and to dynamically allocate LLC 545.

In the illustrated example, a real-time workload ("WL") 505 executes and uses 25 percent of last-level cache 545 (block 502) resulting in 25 percent of the LLC 545 being occupied by the real-time WL 505 (block 504). For example, the real-time WL 505 may provide real-time web services in a cloud environment. The real-time WL 505 may handle real time data processing that involves continual input, process and output of data, which is processed in small time periods or near real time. Other workload(s) ("WL(s)") 515 may also execute and use up to 85 percent of LLC 545 (block 506) resulting in 85 percent of the LLC 545 being occupied by the other WL(s) 515 (block 508). The other WL(s) 515 may be non-real-time workloads that handle other tasks that can be processed or handled in batches (e.g., batch data processing or non-real time data processing). For example, some of the other WL(s) 515 may perform various housekeeping tasks, maintenance tasks or cleanup tasks. The other WL(s) 515 may be noisy neighbors that consume bandwidth, disk I/O, CPU and other resources resulting in an overlap of LLC occupancy.

Because of the overlap of occupancy (e.g., approximately 10 percent overlap of LLC occupancy between the real-time WL 505 and the other WL(s) 515), cache misses may occur (block 510). In a cloud environment, the other WL(s) 515 may be noisy neighbors that increase the cache misses experienced by the real-time WL 505, resulting in unpredictable higher latency for the real-time WL 505. For example, a real-time workload may fight with other workloads for LLC space. Specifically, the cache misses occur because data requested for processing by a component or application (e.g., real-time WL 505), is not found in the cache memory (e.g., LLC 545), which causes execution delays by requiring the real-time WL 505 to fetch the data from other cache levels (if not already in the LLC) or the main memory.

In order to prevent occupancy overlap and the ill effects associated with the overlap (e.g., cache misses or cache-line bounces), the real-time WL 505 may be tagged and tracked to determine the proper LLC allocation for the real-time WL 505. For example, tags or labels may be associated with the real-time WL 505 or other WL(s) 515 may be used to assign the WL to an isolated set of cache-ways 310. For example, the tag or label may be used within a single node (e.g., node 110A) for cache allocation purposes. Additionally, tags or labels may be associated with a pod 160 or real-time WL 505 based on off-line training with an amount of LLC required by the real-time WL 505 (e.g., containers 170A-B running within the pod 160) such that a cluster scheduler 175 may initially find a suitable cluster node for the pod 160.

In the illustrated example, an operating system ("OS") 525 may pin the real-time WL 505 to a CPU(s) belonging to the same CPU socket as the LLC 545 (block 512). In an example, the real-time WL 505 is pinned to CPU(s) belonging to the same CPU socket such that the real-time WL 505 uses the LLC 545 associated with the CPU socket. Then, the real-time WL 505 is pinned to the CPU(s) (block 514). The CPU socket may have a set quantity of CPU(s) as defined by the CPU vendor. In order to monitor the real-time WL 505, the LLC requirements of the real-time WL 505 may be observed in a training environment.

Next, the training environment is entered (block 516). The training environment may be an off-line testing environment and may be created with various test containers 170A-B that make up the real-time WL 505. While in the training environment, the real-time WL 505 executes (block 518) and during execution, the real-time WL 505 occupies 25 percent of LLC 545 (block 520). In an example, the real-time WL 505 may be executed several times or in several different training sessions while in the training environment. The OS 525 measures the LLC occupancy of the real-time WL 505 (block 522). The OS 525 may measure the LLC occupancy with a counter, such as a CPU counter. Additionally, a measurement may be obtained for each training session. While monitoring and/or measuring the LLC occupancy of the real-time WL 505, the OS 525 determines that the LLC occupancy of the real-time WL 505 is 25 percent (block 524). As noted above, the LLC occupancy may be measured multiple times, and the ultimate determination of the LLC occupancy may be based on an average of the measured results or may be the highest LLC occupancy observed during training.

Once the LLC occupancy is determined, the real-time WL 505 is removed from the training environment (e.g., exit the training environment) (block 526). For example, the real-time WL 505 may be deployed provide real-time web services in a cloud environment. The OS 525 then reserves 25 percent of LLC 545 (e.g., the measured LLC occupancy at blocks 522 and 524) for the real-time WL 505 (block 528). Specifically, 25 percent of the LLC 545 may be allocated to the real-time WL 505. The LLC 545 may be allocated by the OS 525 or by a cache allocator (e.g., cache allocator 189A of FIG. 1). Upon reservation, 25 percent of the LLC 545 is allocated, reserved or isolated for the real-time WL 505 (block 530). Once the LLC 545 is allocated or reserved for the real-time WL 505, the real-time WL 505 may provide real-time web services and store, write or retrieve data from LLC 545. Similarly, the OS 525 isolates the other WL(s) 515 (block 532), such that the other WL(s) are isolated to the remaining 75 percent of the LLC 545 (block 534). Specifically, 75 percent or less than 75 percent of the LLC 545 may be allocated to the other WL(s) 515. Similar to the allocation for the real-time WL 505, the LLC 545 may be allocated by the OS 525 or by a cache allocator (e.g., cache allocator 189A of FIG. 1). Upon isolation, 75 percent of the LLC 545 is allocated, reserved or isolated for the other WL(s) 515 to prevent cache misses (block 536).

Continuing on FIG. 5B, after the initial allocations are made and the real-time WL 505 is isolated from the other WL(s) 515, the monitoring phase begins (block 538). For example, the real-time WL 505 may be monitored such that cache allocations may be adjusted for future changes of LLC demand. In the illustrated example, the OS 525 polls a CPU counter associated with the real-time WL 505 (block 540). In an example, the OS 525 may occasionally poll the CPU counter to ensure that the real-time WL 505 has an appropriate amount of LLC 545 to perform real-time web services in the cloud environment. During the monitoring phase, the real-time WL 505 experiences additional network traffic that requires 35 percent LLC occupancy instead of the initially allocated 25 percent occupancy (block 542). For example, there may be an increase in network traffic resulting in additional consumption of real-time web based services on the cloud. The OS 525 determines the updated LLC occupancy of the real-time workload is currently 35 percent (block 544). Specifically, the additional consumption of the real-time web based services provided by real-time WL 505 may result in an additional 10 percent of LLC occupancy by the real-time WL 505. The OS 525 may determine that the LLC occupancy increased based on information received while polling the CPU counter. Alternatively, other monitors may provide data to the OS 525 (e.g., cache monitor 187A or bandwidth monitor 187B of FIG. 1).

Based on the updated LLC occupancy, the OS 525 adjusts the LLC reservation for the real-time WL from 25 percent to 35 percent (block 546). For example, the OS 525 may allocate 35 percent of the LLC 454 for the real-time WL 505, such that 35 percent of the LLC 545 is reserved for the real-time WL 505 (block 548). Similarly, the OS 525 may again isolate the other WL(s) 515 from the real-time WL 505 (block 550). In the illustrated example, the OS 525 isolates the other WL(s), such that the other WL(s) 515 are isolated to the remaining 65 percent of the LLC 545 (block 552). The allocations and isolations may be performed in the same way the original allocations were made. Specifically, 65 percent of the LLC 545 may be allocated to the other WL(s) 515, such that the remaining 65 percent of the LLC 545 is reserved for the other WL(s) 515 (block 554). By providing dynamic adjustments to the LLC 545 allocated to the real-time WL 505, there are several improvements over static allocation systems. For example, in a static allocation system that is unable to make dynamic adjustments, in some cases, the system may reserve too much LLC 545 for the real-time WL 505 thereby resulting in an inefficient use of resources. Alternatively, the system may reserve too little LLC 545 for the real-time WL 505 thereby increasing the likelihood of latency spikes, poor WL performance and perhaps even application crashes.

Dynamically adjusting the LLC 545 allocation while maintaining isolation may require eviction of one or more WL(s) (e.g., real-time WL 505 or other WL(s) 515). In the illustrated example, WL eviction (block 556) may occur after the OS 525 determines the updated LLC occupancy of the real-time WL 505 is 45 percent instead of 35 percent (block 558). If there is insufficient LLC 545 to support both the real-time WL 505 and the other WL(s) 515, a scheduler 535 may evict one or more of the WL(s) from the cluster node that currently supports the WL(s) (block 560). The scheduler 535 may be a cluster scheduler (e.g., cluster scheduler 175 of FIG. 1). In one example, the real-time WL 505 may (optionally) be evicted and moved to another suitable cluster node (block 562). For example, the real-time WL 505 may be re-assigned to a different node 110 (e.g., moved from node 110A to 110C) if the real-time workload 505 uses more LLC 545 than is currently reserved for or allocated to the real-time workload 505 and there is insufficient LLC availability on the current ode (e.g., node 110A). Similarly, in another example, one or more of the other WL(s) 515 may (optionally) be evicted from the cluster node to make additional room (e.g., free up LLC 545) for the real-time WL 505 on the cluster node (block 564). For example, these other WL(s) 515 may be re-assigned to a different node 110. Alternatively, some of the of the other WL(s) 515 may be temporarily paused, stopped or killed to free up additional LLC 545 for the real-time WL 505 until network traffic decreases.

Figure 6:
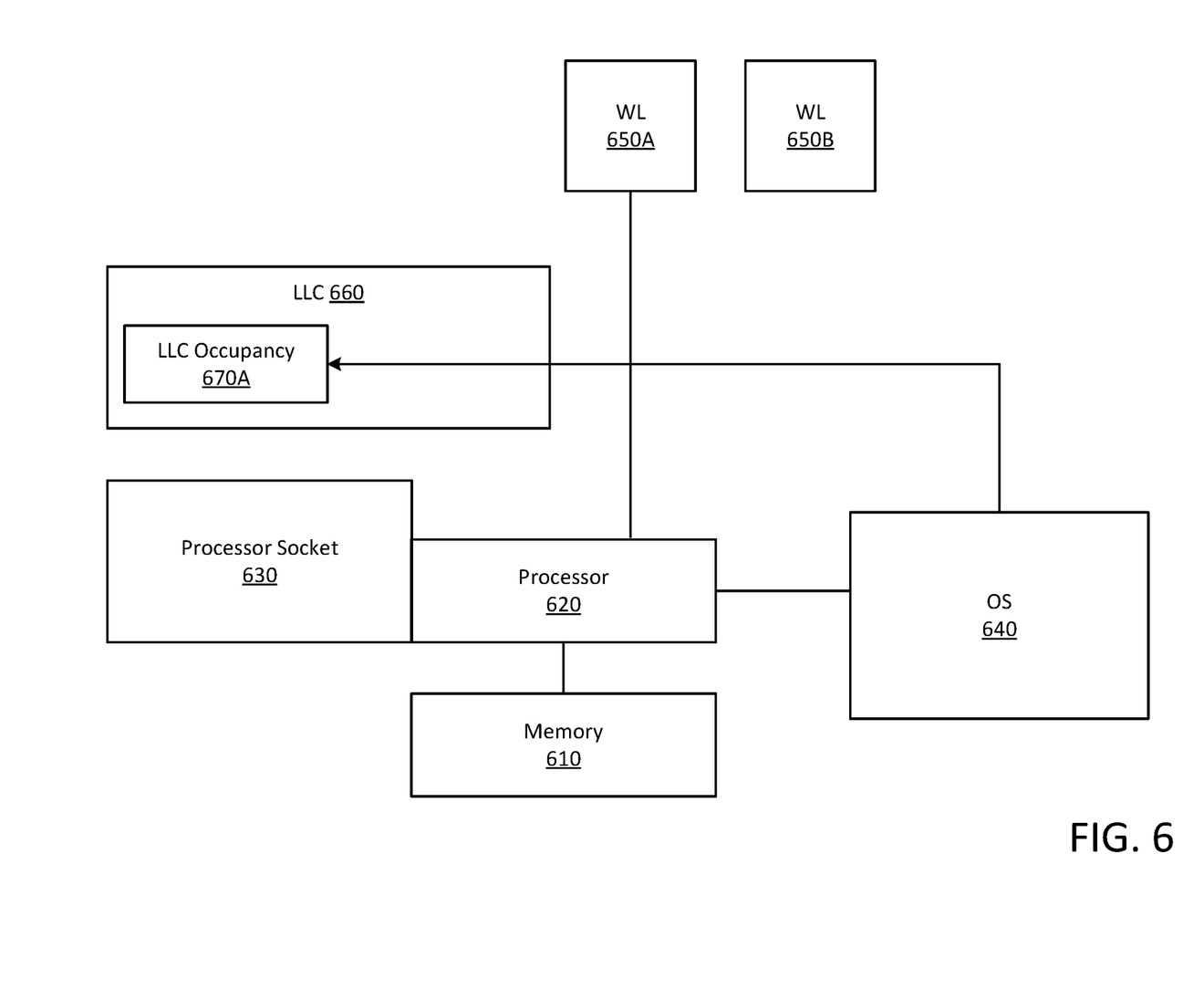
FIG. 6 illustrates a block diagram of an example cache allocation system according to an example embodiment of the present disclosure.

FIG. 6 is a block diagram of an example cache allocation system 600 according to an example embodiment of the present disclosure. The system 600 includes a memory 610, a processor 620 in communication with the memory 610, and an operating system 640 executing on the processor 620. The processor 620 may belong to a processor socket 630. The OS 640 may be configured to pin a workload 650A of a plurality of workloads 650A-B to the processor 620 belonging to the processor socket 630. In an example, each respective processor (e.g., processor 620) belonging to the processor socket 630 shares a common last-level cache 660. Additionally, the OS 640 may also be configured to measure an LLC occupancy 670A for the workload 650A and reserve the LLC occupancy 670A for the workload 650A thereby isolating the workload 650A from other respective workloads (e.g., WL 650B) of the plurality of workloads 650A-B sharing the processor socket 630. The OS 640 may also be configured to maintain isolation by monitoring the LLC occupancy 670A for the workload 650A.

Maintaining isolation may include dynamically adjusting cache allocations (e.g., dynamically making changes to LLC occupancy 670A), re-assigning a WL 650A-B to another node, evicting a WL (e.g., WL 650B) from the current node, or temporarily pausing or stopping a WL (e.g., WL 650B). The ability to dynamically allocate LLC cache for real-time workloads (e.g., WL 650A) provides several advantages over static allocation systems, which may otherwise allocative too much LLC 660 resulting in an inefficient use of resources or may otherwise allocate too little LLC 660 resulting in latency spikes, poor performance or potential system crashes. The cache allocation system 600 as well as the techniques described herein may be particularly useful for public and private cloud providers. Additionally, having the ability to run real-time workloads (e.g., WL 650A) with predictable latency may increase Openshift usage in 5G edge environments, which may improve application performance and responsiveness by reducing lengthy data paths. For example, data may typically make a round trip to and from cloud data centers to get processed, but these longer data paths may be avoided with edge computing.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   a processor in communication with the memory, the processor belonging to a processor socket;
   at least one of a cluster scheduler and a kernel; and
   an operating system (OS) executing on the processor, the OS configured to:
   pin a workload of a plurality of workloads to the processor belonging to the processor socket, wherein the workload is at least one of a real-time workload and a workload requiring predictable latency, each respective processor belonging to the processor socket share a common last-level cache (LLC), the at least one of the cluster scheduler and the kernel is configured to tag the workload, and wherein the tag contains the LLC occupancy for the workload,
   measure an LLC occupancy for the workload;
   reserve LLC allocation for the workload based upon the measured LLC occupancy thereby isolating the workload from processor demand fluctuations generated by other respective workloads of the plurality of workloads sharing the processor socket; and
   maintain isolation by monitoring the LLC occupancy for the workload and continually reallocating the LLC allocation responsive to the monitoring.

2. The system of claim 1, wherein measuring the LLC occupancy includes monitoring a counter for a predetermined time interval.

3. The system of claim 2, wherein the counter is a central processing unit (CPU) counter.

4. The system of claim 1, wherein the OS is configured to measure the LLC occupancy for the workload in an off-line training environment.

5. The system of claim 1, wherein when reserving the LLC allocation for the workload, the OS is configured to:
divide the LLC into a plurality of cache-ways,
assign the workload to a first cache-way of the plurality of cache-ways, and
restrict the other respective workloads from accessing the first cache-way.

6. The system of claim 5, wherein the first cache-way is assigned to the processor that the workload is pinned to, and wherein the first cache-way is a consecutive range of cache-lines.

7. The system of claim 1, wherein the OS is configured to re-compute a plurality of updated LLC allocation values for the workload when maintaining isolation by monitoring the LLC occupancy for the workload.

8. The system of claim 1, further configured to:
identify a cluster node according to at least one of (i) the LLC occupancy of the workload, (ii) an amount of LLC available on the cluster node, and (iii) a load-balancing parameter, prior to pinning the workload to the processor, and
assign the workload to a processor within the cluster node.

9. A method comprising:
pinning a workload of a plurality of workloads to a processor belonging to a processor socket, wherein the workload is at least one of a real-time workload and a workload requiring predictable latency, and wherein each respective processor belonging to the processor socket share a common last-level cache (LLC);
measuring an LLC occupancy for the workload;
tagging, via at least one of a kernel or a scheduler, the workload, wherein tagging the workload includes associating the workload with a label, and wherein the label indicates the LLC occupancy for the workload;
reserving an LLC allocation for the workload based upon the measured LLC occupancy thereby isolating the workload from processor demand fluctuations generated by other respective workloads of the plurality of workloads sharing the processor socket; and
maintaining isolation by monitoring the LLC occupancy for the workload and continually reallocating the LLC allocation responsive to the monitoring.

10. The method of claim 9, further comprising:
dynamically adjusting the LLC allocation for the workload to an updated LLC allocation; and
reserving the updated LLC allocation for the workload thereby isolating the workload from the other respective workloads of the plurality of workloads sharing the processor socket.

11. The method of claim 9, wherein measuring the LLC occupancy includes monitoring a counter for a predetermined time interval, and wherein monitoring the counter includes polling the counter.

12. The method of claim 9, wherein measuring the LLC occupancy for the workload is performed during an off-line training period.

13. The method of claim 9, wherein reserving the LLC allocation for the workload includes:
dividing the LLC into a plurality of cache-ways;
assigning the workload to a first cache-way of the plurality of cache-ways; and
restricting the other respective workloads from accessing the first cache-way.

14. The method of claim 13, wherein the first cache-way is assigned to the processor that the workload is pinned to, and wherein the first cache-way is a group of cache-lines.

15. The method of claim 9, further comprising:
prior to pinning the workload to the processor, identifying a cluster node according to at least one of (i) the LLC occupancy of the workload, (ii) an amount of LLC available on the cluster node, and (iii) a load-balancing parameter; and
assigning the workload to the cluster node.

16. The method of claim 15, further comprising re-assigning the workload to a different cluster node responsive to updates to one or more of (i), (ii) and (iii).

17. A non-transitory machine-readable medium storing code which, when executed by a computer system, cause the computer system to:
pin a workload of a plurality of workloads to a processor belonging to a processor socket, wherein the workload is at least one of a real-time workload and a workload requiring predictable latency, and wherein each respective processor belonging to the processor socket share a common last-level cache (LLC);
measure an LLC occupancy for the workload;
tag, via at least one of a kernel or a scheduler, the workload, wherein tagging the workload includes associating the workload with a label, and wherein the label indicates the LLC occupancy for the workload;
reserve an LLC allocation for the workload based upon the measured LLC occupancy thereby isolating the workload from processor demand fluctuations generated by other respective workloads of the plurality of workloads sharing the processor socket; and
maintain isolation by monitoring the LLC occupancy for the workload and continually reallocating the LLC allocation responsive to the monitoring.

* * * * *